Figure 1:
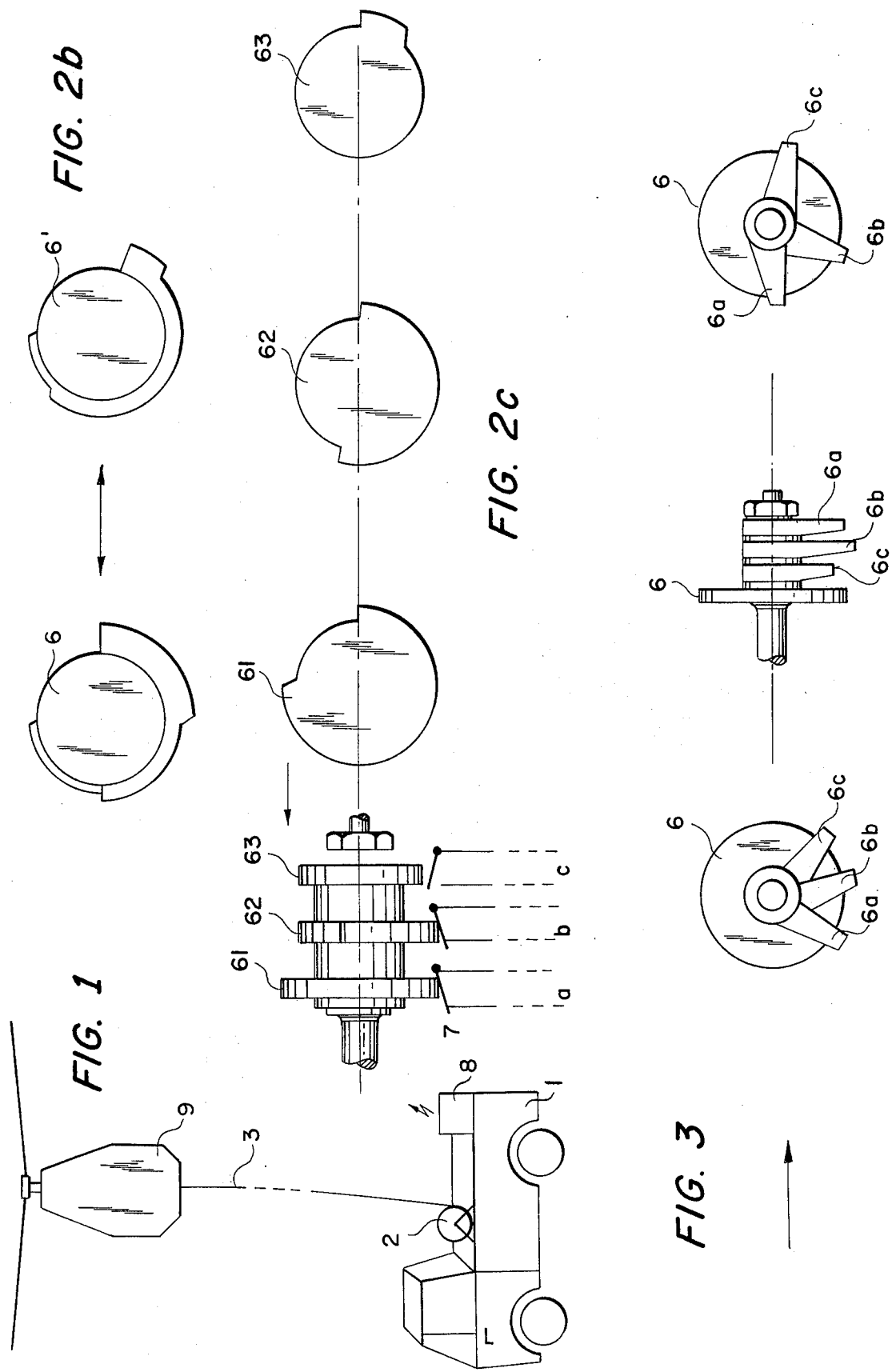

United States Patent

Kozakiewicz et al.

[11] 4,058,277
[45] Nov. 15, 1977

[54] CAPTIVE REMOTE-CONTROLLED HELICOPTER

[75] Inventors: Hugo Kozakiewicz, Uhldingen-Muhlhofen; Wolfgang Reuter, Friedrichshafen, both of Germany

[73] Assignee: Dornier GmbH., Germany

[21] Appl. No.: 709,268

[22] Filed: July 28, 1976

Related U.S. Application Data

[63] Continuation-in-part of Ser. No. 594,004, July 8, 1975, abandoned.

[30] Foreign Application Priority Data

Sept. 19, 1974 Germany .............................. 2444775

[51] Int. Cl.² ............................................. B64C 27/04
[52] U.S. Cl. ................................ 244/17.17; 244/17.13
[58] Field of Search ..................... 244/17.13, 17.17, 33; 343/6 R; 178/6; 254/172

[56] References Cited

U.S. PATENT DOCUMENTS

| | | | |
|---|---|---|---|
| 1,433,079 | 10/1922 | Jett | 254/172 |
| 3,149,803 | 9/1964 | Petrides et al. | 244/17.17 X |
| 3,217,097 | 11/1965 | Pauli et al. | 244/17.17 X |

Primary Examiner—Trygve M. Blix
Assistant Examiner—Barry L. Kelmachter
Attorney, Agent, or Firm—James E. Bryan

[57] ABSTRACT

An improvement is disclosed in a helicopter adapted to fly while moored to a ground station, being remote-controlled therefrom and having a device for automatic stabilization of the flight attitude, and in which the mooring cable is wound-on and wound-off of a cable drum by a drive device, the improvement comprising a stabilizer in the helicopter adapted to be switched to different operating ranges, and a switching device in the ground station coupled with the cable drum, the switching device being adapted to transmit signals for the stabilizer in dependence upon the wound-off length of the mooring cable.

5 Claims, 6 Drawing Figures

CAPTIVE REMOTE-CONTROLLED HELICOPTER

This application is a continuation-in-part of U.S. application Ser. No. 594,004, filed July 8, 1975, now abandoned.

The present invention relates to a helicopter which is moored to a ground station and remote-controlled therefrom. Such helicopters are employed, for example, as carriers for instruments used for the most diversified measuring, observation, and monitoring tasks, for instance as antenna carriers or as platforms for television cameras.

The mooring cable is wound in the ground station on a cable drum on which it can be wound and unwound by means of a drive device. The type of drive employed for the rotor system of the helicopter is of secondary importance for the essence of the present invention. The drive may be effected, for example, electrically through the cable. Another example is the use of an internal combustion engine which is supplied through a fuel line in the mooring cable. The control of the helicopter is also effected from the ground station. The remote control signals may be transmitted by radio or also by way of specific signal lines in the mooring cable. Also, the measuring or the observation results may be transmitted in an analogous manner from the helicopter to the ground station.

For fulfilling their missions, it is generally extremely important that the captive helicopters maintain a prescribed flight attitude as accurately as possible. Since, however, it is extremely difficult to determine small deviations in the position of the helicopter and to transmit corresponding control signals for stabilizing the flight attitude from the ground to the helicopter, such a captive and remote-controlled helicopter is further generally equipped with means for the automatic stabilization of the flight attitude. The stabilization of the flight attitude is effected thereby without the interposition of the ground station. Yet, certain difficulties arise in connection with the automatic stabilization inasmuch as, in the case of a very long mooring cable, i.e., at a greater flight altitude, the helicopter exhibits a flight behavior which nearly corresponds to unmoored free flight. In the case of a shorter cable length, on the other hand, in other words, for a captive helicopter on a short cable, the stabilization is completely different. The automatic stabilization device which operates faultlessly at a long cable length fulfills its purpose only poorly as the cable length becomes shorter, and finally becomes totally unusable in view of its behavior.

It is therefore the object of the present invention to eliminate this difficulty in captive helicopters occuring in the stabilization of the flight attitude.

This object is obtained, in accordance with the present invention, by virtue of the fact that the stabilizing device in the helicopter is adapted to be changed to different operating ranges, and by virtue of the fact that in the ground station, a switching device is coupled with the cable drum, from which switching device emanates switching or shifting signals for the stabilizing device in dependence upon the wound-off length of the mooring cable.

According to an advantageous further development of the present invention, a device which actuates electric switch contacts is coupled with the cable drum through a high reduction gear. The gear is advantageously so designed that it reduces the revolutions of the cable drum required for a complete extension of the mooring cable into less than one revolution of the switching device. The behavior of the stabilizing device is thus adapted, by sections with the extension or the retraction of the mooring cable, to the respective flight behavior of the captive helicopter in the corresponding flight altitude.

Figure 2:
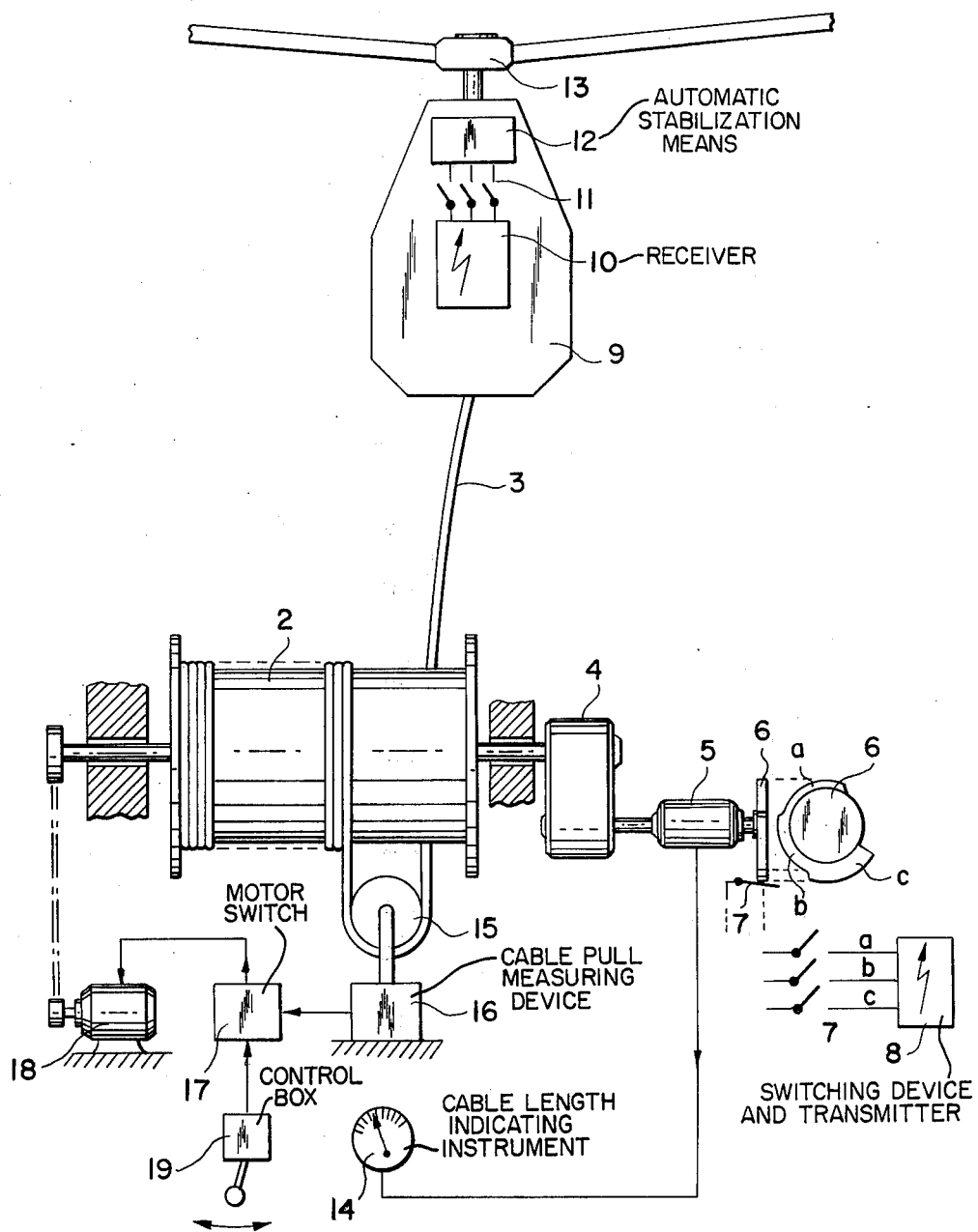
Figure 2A:
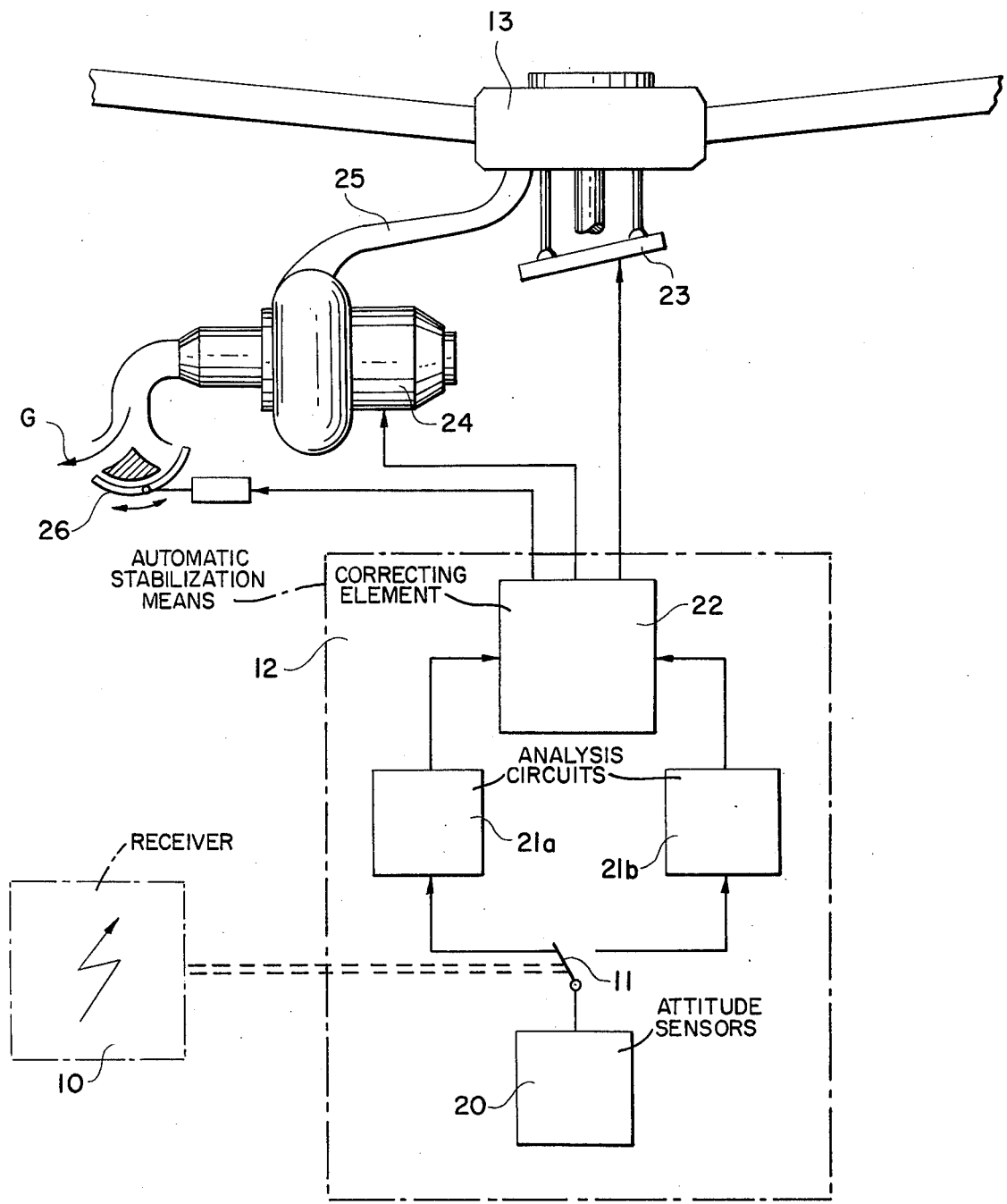

One embodiment of the present invention will now be further described hereinafter with reference to the accompanying drawings, wherein:

FIG. 1 schematically illustrates a captive helicopter with the ground station therefor;

FIG. 2 schematically illustrates the structural elements which are important for a stabilization of the flight attitude, FIG. 2a schematically illustrates the automatic stabilizer which is on board the helicopter, FIG. 2b illustrates different forms of cams employed in the construction of FIG. 2, FIG. 2c illustrates a still further type of cam which may be employed in the construction of FIG. 2, and FIG. 3 illustrates yet another form of cam which may be employed in the construction of FIG. 2.

Shown in FIG. 1 as a ground station is, for example, a vehicle 1. On this vehicle 1 is the cable drum 2 on which the mooring cable 3 is wound and unwound during the retraction and extension of the helicopter 9. As already has been indicated hereinabove, the type of rotor drive for the helicopter 9 is of no importance in the present invention. Also on the vehicle 1 of the ground station is a switching device 8. The arrow is intended to indicate that this switching device 8 serves as a transmitter for signals which are transmitted to the helicopter 9. The transmission of these signals is also of secondary importance in the present invention. The signal transmission is possible, for example, by radio, or also by wires.

The operation of the present invention now will be explained with reference to FIG. 2. The mooring cable 3 for the helicopter 9 is wound on the cable drum 2 in one or more layers. The cable drum 2 is driven by a motor 18 for the extending and retracting operations of the helicopter 9. The motor 18 is controllable, for example, by an operator by way of the control box 19 and the motor switch 17. Indicated in a greatly simplified fashion in the helicopter 9 is the rotor head 13 with the control means for the helicopter and the stabilizing device 12, from which latter the control means for the rotor head are actuated for stabilization of the flight attitude.

The automatic stabilizer itself is not the object of the invention, but nevertheless will be briefly explained by reference to FIG. 2a. The stabilizing system 12 comprises known components which operate in a well known manner. Sensors, for instance the gyros 20, are provided to determine the instantaneous attitude of the aircraft. The signals generated by the sensors are fed to an analysis circuit 21a or 21b forming, also in known manner, correction or control signals. These signals are fed to a correcting element 22 which adjusts the controls, omitted from representation and also known, in the rotor head 13. The design and the kind of controls depends upon the particular rotor system, for instance a helicopter, being used, and is without effect on the invention. In a special case, for instance, the angle of attack of the rotor blades may be adjusted by a swash plate 23 or a spider, whereas in another case the entire rotor head may be inclined. For the sake of completeness, it is noted that obviously the automatic stabilizer may also affect the drive power of the helicopter, in known manner. FIG. 2a for instance shows a drive unit 24 for the case of the helicopter being driven by jet reaction, the unit being controlled by the correcting element 22 and supplying gases or compressed air through the flexible conduits 25 to the rotor head 13 and from there to the rotor blades. In order to also obtain stabilization in azimuth, the correcting element 22 — as also shown — may actuate a flap 26 at the exhaust of the engine exhaust gases G, whereby the exit direction of these gases may be changed for the purpose of control or stabilization. Instead, again, one may employ a tail rotor which may be adjusted by the correcting element 22 for the purpose of azimuth stabilization.

Also shown in FIGS. 2 and 2a, in the helicopter 9 is a receiver 10 which is in operative communication with the switching device 8 of the ground station serving as a transmitter. Connecting lines extend from the receiving device 10 to the stabilizing device 12. Switches 11 are in the connecting lines and serve for effecting a shifting of the stabilizing device in dependence upon the signals received.

FIG. 2a shows the operation of the switch 11. This switch allows switching with respect to stabilization direction, the output signals from the sensor 20 being selectively fed to an analysis circuit 21a or 21b. Because the analysis circuits 21a and 21b are different, each forms different correction or control signals which are then fed to the correcting element 22. Consequently, element 22 will also affect the aforementioned controls somewhat differently. Switching from one mode of operation of the automatic stabilizer to the other, or the control signals obtained in such different manner may result in that the correcting element 22 will affect uniformly and less strongly all parts of the control system, or in that it reinforces, the effect on a given unit, for instance the drive unit 24 while that on another, for instance the swash plate 23, is lessened. It is further noted that more than mere switching from one to another of the analysis circuits 21a and 21b is feasible, namely that still other ways for forming correction signals in other further analysis circuits may be provided. This is indicated in FIG. 2 by the three-way switch 11. By switching and forming different correction signals from the sensor signals as a function of the paid-out length of mooring cable, the operation of the automatic stabilizer may be made adaptable to the particular flight altitude, for instance for two or even more altitude steps.

Connected in the ground station to the shaft of the cable drum 2 is a reduction gear 4. The reduction of this gear is so great that all the drum revolutions required for the complete unwinding of the mooring cable are converted into less than one revolution at the output of the reduction gear.

Furthermore, another cam disc 6 is mounted at the output of the reduction gear 4 on the same shaft as a position tap 5. This cam is shown in side view, transversely to its axis of rotation, and upon revolving may open, in known manner, a switch 7, and close it similarly. Cam 6 is shown to the right in another view, namely seen along the axis of rotation. It will be noted that the cam includes various segments a, b, and c with different heights. As indicated, corresponding switches 7a, 7b and 7c are actuated by the cam. These switches are mounted in fixed positions opposite the cam contour and when actuated release from the system 8, which as discussed above acts as a remote-control transmitter, corresponding remote-control signals, which are transmitted from the transmitter to the helicopter 9. The switches 7a, 7b and 7c may be simple, separate switches or a single known stepping switch.

These signals characterize the respectively extended cable length. As has been stated hereinabove, these signals bring about a corresponding adjustment in the helicopter 9 of the stabilizing device 12. The cam 6 and the cam switch 7 may be constructed in any desired known manner. Advantageously the cam 6 should be interchangeable with another cam 6', as indicated in FIG. 2b. As will be noted, the length of the individual cam heights differs along the cam contour. The particular cam length corresponds to an associated length of the paid-out mooring cable. Therefore, simple interchanging of the cams allows switching from one mode of operation of the automatic stabilizer to another at different flight altitudes and to achieve in this manner adaptation to different types of moored helicopters.

However, it is also possible to replace a single cam disc 6 with two or more different cam heights by special cams 61, 62 and 63 on a common shaft and to separate them by suitable spacers. This is shown in FIG. 2c. The left part of the Figure shows the mounting of the cams on their shaft, and furthermore how each can actuate its associated switch 7a, 7b and 7c. The right side of FIG. 2c shows the contours of the cams 61, 62 and 63. The lengths of the individual cams at the periphery of the cam discs are assigned to a given length of cable and hence to a definite flight altitude.

FIG. 3 shows in simplified form another possibility for a possibly required adaptation of the cam discs to the desired flight altitudes. In this example, a simple cam 6 is mounted on the shaft, which also holds three arms 6a, 6b and 6c held to the shaft by a nut. The arms 6a, 6b and 6c project by their ends beyond the rim of the cam 6 and thus form switching cams. Upon loosening the nut, the arms 6a, 6b and 6c may be mutually rotated so that other switching times, and hence cable lengths, may be set. Obviously other elements, for instance cam segments, may be used in lieu of the arms 6a, 6b and 6c.

Additionally connected to the output of the reduction gear 4 is advantageously a position tapping means 5, for example a potentiometer, from which an optical indication of the extended cable length is possible. The optical indication for the operating personnel has been outlined by the indicating instrument 14. Further positioned at the cable drum 2 is a cable pull monitoring device. The construction of this device is also no part of the present invention and therefore is not further described herein. It merely has been outlined here that the mooring cable 3 may be guided, for example, over a roller 15, at which time the cable pull acting upon the roller 15 is determined by the cable pull measuring device 16. The arrangement is made herein in a manner such that, in the case of a falling below a minimum cable pulling force; in other words, when the helicopter 9 loses altitude, or even when only the lift is reduced, the motor switch 17 is so influenced by the cable pull measuring device 16 that a return winding of the mooring cable 3 is automatically initiated by the motor 18. This has the result and assures that the mooring cable 3 is constantly under tension. Here again, the instantaneous cable length is determined at all times by way of the cam 6 and the switch 7, and signals are sent out accordingly to the helicopter 9 for purposes of the adjustment of the stabilizing device 12 to the respective flight altitude.

It will be obvious to those skilled in the art that many modifications may be made within the scope of the present invention without departing from the spirit thereof, and the invention includes all such modifications.

What is claimed is:

1. In a helicopter adapted to fly while moored to a ground station and being remote-controlled therefrom, with means in the helicopter for automatic stabilization of the flight attitude, and in which the mooring cable is wound-on and wound-off of a cable drum by a drive means, the improvement comprising means whereby said automatic stabilization means in the helicopter is adapted to be switched to different operating modes, and switching means in the ground station coupled to said cable drum, said switching means actuating a transmitting means to transmit control signals to a receiving mechanism for said automatic stabilization means in dependence upon the wound-off length of said mooring cable.

2. A helicopter according to claim 1 in which said switching means includes adjustable cam switch means.

3. A helicopter according to claim 1 including means for monitoring the tractive force of said mooring cable and being adapted to actuate said drive means to effect a winding-up of said cable when a minimum tractive force is not maintained.

4. In a helicopter adapted to fly while moored to a ground station and being remote-controlled therefrom, with means in the helicopter for automatic stabilization of the flight attitude, and in which the mooring cable is wound-on and wound-off of a cable drum by a drive means, the improvement comprising means whereby said automatic stabilization means in the helicopter is adapted to be switched to different operating modes, cam means adapted to actuate electric switch contacts, said cam means being coupled to said cable drum through a high reduction gear means, and switching means in the ground station coupled with said cable drum, said switching means being adapted to transmit control signals for said automatic stabilization means in accordance with the wound-off length of said mooring cable.

5. A helicopter according to claim 4 in which the high reduction gear means reduces the revolutions of the cable drum required for a complete unwinding of the mooring cable to less than one revolution of said cam means.

* * * * *